United States Patent [19]
Chesworth et al.

[11] Patent Number: 5,630,934
[45] Date of Patent: May 20, 1997

[54] IN-SITU TREATMENT SYSTEM FOR INHIBITING THE FORMATION OF, AND FOR ALLEVIATING, ACIDITY IN WATER

[75] Inventors: Ward Chesworth, Eden Mills; Gene S. Shelp; Barry J. Shelp, both of Guelph, all of Canada

[73] Assignee: Enpar Technologies Inc., Guelph, Canada

[21] Appl. No.: 518,334

[22] Filed: Aug. 23, 1995

[51] Int. Cl.⁶ .................................................. C02F 1/46
[52] U.S. Cl. .................. 205/742; 205/724; 205/730; 205/731; 205/745
[58] Field of Search .................................. 204/130, 149, 204/150; 205/724, 730, 731, 742, 745

[56] References Cited

U.S. PATENT DOCUMENTS

| | | | |
|---|---|---|---|
| 3,823,081 | 7/1974 | Treharne et al. | 204/151 |
| 4,026,772 | 5/1977 | Ammann et al. | 204/106 |
| 4,479,857 | 10/1984 | Barton, Jr. | 204/130 |
| 4,561,948 | 12/1985 | Stiller | 204/129 |
| 4,676,878 | 6/1987 | Chez | 204/101 |
| 4,678,554 | 7/1987 | Oppitz | 204/299 |
| 5,028,307 | 7/1991 | Rightmyer | 204/278 |
| 5,108,563 | 4/1992 | Cook | 204/149 |

FOREIGN PATENT DOCUMENTS

| | | | |
|---|---|---|---|
| 63-221887 | 9/1988 | Japan | 204/150 |
| 2202862 | 10/1988 | United Kingdom | C02F 1/46 |
| WO92/02462 | 2/1992 | WIPO | C02F 1/46 |

Primary Examiner—Arun S. Phasge
Attorney, Agent, or Firm—Anthony Asquith & Co.

[57] ABSTRACT

Treatment is described for acidity caused by water seeping down through a seam of acid-generating mineral such as pyrite. The pyrite oxidises through exposure to the atmosphere (as a result of mine workings). The treatment system creates an galvanic cell, using the submerged portion of the pyrite seam as the cathode, the water in the aquifer as the electrolyte, and a body of scrap iron immersed in the water as the (sacrificial) anode. Contact rods are inserted into the pyrite seam, and are connected, via a cable, to the body of scrap iron, which is placed in a nearby pond. Hydrogen ions migrate to the cathode and bubble off as hydrogen gas, raising the pH. The acid generating reactions in the pyrite seam are inhibited, and acid concentrations in the already contaminated water in the pond and in the aquifer are reduced. In an alternative, the exposed beaches of pyrite in a tailings pond are provided with grids of metal mesh or graphite in place of the inserted rods. The grids provide a better contact with the pyrite.

15 Claims, 2 Drawing Sheets

IN-SITU TREATMENT SYSTEM FOR INHIBITING THE FORMATION OF, AND FOR ALLEVIATING, ACIDITY IN WATER

Water that has seeped through certain kinds of mineral systems often is found to contain an unacceptably high concentration of acid. For example, precipitation water that has seeped through a mass or seam of pyrite (ferrous sulphide), where the pyrite is exposed to atmospheric oxygen, can contain an unacceptable concentration of acidity, in the form of cations (ie H+, Fe+++, Al+++, and other metallic species).

Often, for example, the reason a mass or seam of pyrite has become exposed to the atmosphere is that the seam has been exposed by mine-workings; and it is the mine workings, especially in the case of an opencast or strip mine (e.g. a coal mine), that have also produced a quarry in which the pond has become established. Water seeping through an acidity-producing mass or seam of mineral can enter the groundwater and remain underground for a long period, or the water may pass into a local pond or lake. The water in such ponds is often found to be unacceptably acid.

The invention is concerned with retarding the acidity-producing reactions that take place within the exposed mineral masses or seams, and with maintaining an acceptable level of acidity in the ponds and other waters derived therefrom. The invention is also concerned with reducing the levels of acidity in water already present in a pond.

Some of the minerals which cause acidity in seepage water—pyrite, for example—are electrically conductive. The invention is concerned with treating acidity in water seeping through such electrically conductive minerals.

BACKGROUND OF THE INVENTION

It will be understood that there are two aspects to the acidity problem: first, the problem of stopping or significantly retarding the acid producing reactions and second the problem of maintaining the leachate at an environmentally acceptable pH.

At many mines, precipitation water passes through a mass or seam of an acidity-causing mineral such as pyrite (i.e. ferrous sulphide,$FeS_2$) and other sulphide minerals (e.g. CuS, ZnS, FeS). The leachate from such seams may have an environmentally unacceptable pH. The leachate may pass directly into a natural drainage system or indirectly through a body of acid surface water which has collected in a quarry produced during mining.

Pyrite readily oxidizes in the presence of air and water in a complex manner according to a series of reactions which, in total, may be summarized in terms of the following simplified stoichiometric relationship:

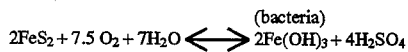
$$2FeS_2 + 7.5\ O_2 + 7H_2O \underset{}{\overset{(bacteria)}{\rightleftharpoons}} 2Fe(OH)_3 + 4H_2SO_4$$

The resulting leachate is acidic, as indicated by the presence of sulphuric acid in the equation.

The iron in the pyrite changes from a reduced state (i.e. Fe++) to an oxidized state (i.e. Fe+++) in the hydroxide, and this change is in itself acid-producing; and by a feedback mechanism this change causes further oxidation and therefore further acidity.

These types of reactions are not confined only to iron. Where the mineral includes a metal other than iron, similar reactions which change the metal to a more oxidised state similarly produce further acidity. The pH in the leachate waters which can be attributed to these mechanisms can be 3 or even lower in a typical real case.

Acidity is dangerous not only in the collection pond in old workings but also because it may be a hazard to a local natural drainage system.

Such acidity can occur wherever precipitation water seeps through exposed pyrite and equivalent minerals. The acidity does tend to disperse eventually, as natural bases dissolve in the acid and by dilution as metals and other substances dissolve in the acid. However, this could take centuries, and relying on natural dispersion is unacceptable in most mine situations. Besides, in many cases, the new water entering the pond, having passed through the exposed pyrite, is also acid, and is not an effective diluent for the acidity of existing waters.

It has been proposed to treat acid pond water with continual additions of bases such as lime, $Ca(OH)_2$. Such treatment systems in general require high maintenance costs, which must be continued, it is estimated in some cases, for hundreds of years.

It should be borne in mind also that, by using a treatment system which attempts to treat the water in the pond, then no matter how effective that treatment system might be the water entering the pond will still be acidic, and the treatment will have to be continued. The cause of the acidity in the pond is the fact that the water entering the pond has passed through expose pyrite, or other acid-producing mineral.

As a way of preventing the acidity-producing reactions from taking place, it has been proposed to seal the acid-generating minerals (pyrite or other) from exposure to atmospheric oxygen. This can be done, for example, (though at great expense) by building a dam and flooding the exposed seam of pyrite; at even greater expense, the exposed portions of the acid-producing mineral can be excavated from the ground, and dumped in a deep lake, with unknown environmental consequences.

Pyrite can become exposed naturally as a result of geological action, but pyrite, once exposed, naturally oxidizes and its acidity-causing properties disappear fairly quickly (as measured on a geological time-scale). In fact, acidity problems arising from naturally exposed pyrite are rarely found: in ponds or lakes that have acidity problems, the problems usually are of man-made origin.

There are of course many chemical reactions known which theoretically—that is to say, in the laboratory, or on a small scale—can serve to cause dilution of acids in water.

However, these reactions have not proved suitable to be economically practised in a body of water having an area which may be measured in the hundreds of hectares. Furthermore, any system of treatment which involves taking the water out of such a pond to be treated will almost certainly be unacceptable on cost grounds.

The principle of the galvanic cell is known, in which two conductors are placed in an acidic electrolyte, the two conductors having different standings in the electrochemical series; if a circuit is established between the two, under the right conditions a current will start to flow. Free electrons become available at the conductors (electrodes), and convert hydrogen ions in the electrolyte to hydrogen gas, which bubbles away. As a result, the pH is raised, and the acidity is diluted. Adding electrical energy into the circuit from outside can be arranged to serve to increase the acid-diluting activity.

It is an aim of the invention to utilize the principle corresponding to that of the galvanic cell actually in the ground, for the purpose of preventing the natural acidity-producing reactions from taking place.

U.K. Patent Application GB2 202 862A (Ontario, January, 1987), U.S. Pat. No. 4,678,554 (Eltac, July, 1987), U.S. Pat. No. 3,823,081 (Kettering, July, 1974), U.S. Pat. No. 4,561, 948 (Stiller, December, 1985), Russian Patent 1556589 (Russkikh, no date), are examples of prior publications, in which what might be called a galvanic cell principle is utilized. Three of these—Ontario, Eltac and Russkikh have nothing to do with the treatment of acid mine drainage, nor with the retardation nor prevention of acid generating reactions.

U.S. Pat. No. 4,561,948 (Stiller, December, 1985) is an example of a prior publication of a small scale system for treating acidity, in which what might be called a galvanic cell principle is utilized to treat acidity. While such a system might be acceptable for, say, protecting the water drawn off from a well, it is wildly uneconomic for use on a large body of water. The cost of providing a large enough vessel in which to carry out the treatment, alone is prohibitive.

U.S. Pat. No. 3,823,081 (Kettering, July, 1974) is a second example of a prior publication, in which what might be called a galvanic cell principle is used to treat acidity. It relies upon pre-treatment of mine water before the water is pumped into an electolytic cell contained within an artificial medium such as glass, plastic or cement. It does not use the acid generating mineral as an electrode, both anode and cathode are artificial materials and an external power source is used. It is uneconomic for a large body of water and does not prevent acid generation.

It may be noted that the Stiller patent is concerned solely with the treatment of water that already contains a high concentration of acid. The treatment system of the invention may also be used for treating an already contaminated pond of water (although, unlike Stiller or Kittering, in the invention the water is treated while remaining actually in the pond). The invention, however, is aimed more at preventing the acidity-producing reactions from taking place at all, an aspect which is not addressed in Stiller or Kettering.

In an optional alternative application a body of acid-generating mine tailings is converted into the cathode of an electrochemical cell by the insertion of a grid or grids of metal mesh. Ontario and Eltac also employ meshes, but they are employed as electrodes themselves. In the case of the invention, the mesh is merely a way of incorporating the tailings into an electrochemical cell. In other words the mesh in the invention acts simply as an electrical lead or connector, not as an electrode. The tailings constitute the true electrode.

It is an aim of the invention that the treatment of the water should take place with the water remaining actually in the ground.

It is an aim of the invention that the seepage water emerging through the exposed pyrite or other mineral, in the ground, should contain only an acceptably low concentration of acid.

It is also an aim of the invention to provide a treatment system which can be left to operate by itself, with little or no maintenance. It happens sometimes that mine workings are not just closed, but are totally abandoned, with no resources left for such things as cleaning up acidity. It is an aim of the invention to provide a treatment system which can be put in place economically in a mine in which such total abandonment is contemplated, being a treatment system which can be expected to keep acidity effectively under control indefinitely, with minimum or zero maintenance.

GENERAL FEATURES OF THE INVENTION

In its preferred form, the invention lies in converting the acid-producing material, being material in the ground (whether that is pyrite or some other mineral), into the cathode of a galvanic or electrochemical cell. A complementary electrode, i.e. an anode, is formed by a body of scrap iron, or other acceptable metal. The anode is connected to the cathode by an electrical connector, such as a cable. The circuit is completed by placing the anode in the leachate which acts as the electrolytic medium of the cell.

Metallic iron is more active electro-chemically than pyrite (iron sulphide), whereby the iron becomes the anode, and the pyrite becomes the cathode. Where the acidity-producing mineral is not pyrite, or where the metal for the anode is not iron, it should be borne in mind that the material that is intended to constitute the anode must be more electro-chemically active than the mineral that is to form the cathode.

Broadly, the invention consists in a procedure for preventing acid-generating reactions and for maintaining the acidity of the leachate at an environmentally acceptable level before entering a natural drainage system.

The invention is applicable when there exists a seam or body of an acidity-causing mineral, in such a position that oxygenated water may pass through the said body. The invention is applicable when the position of the seam or body of the mineral is such that at least a portion of the seam of the mineral lies cut off from exposure to atmospheric oxygen; preferably, the lower portion of the seam or body lies submerged in the aquifer, i.e. below the water table in the surrounding ground.

("Aquifer" is here used in its broad sense, to signify a body of ground which contains groundwater. The term should not be construed in a narrow sense as signifying only a body of ground containing a drinking water supply.)

In the invention, electrical contact is established between the seam or mass of the mineral and the cable or other connector. The invention requires the mineral to be electrically conductive (as pyrite is). By virtue of the fact that the submerged portion of the seam or mass is in contact with the groundwater, electrical contact is also established between the mineral seam and the water in the aquifer. The scrap iron or other material that is to comprise the anode is so placed as to be in electrical contact with the water in the aquifer.

In the invention, there is electrolytic continuity of the water in the aquifer between the water in which is submerged the seam or mass of the mineral which comprises the cathode, and the water in which is immersed the iron or other material which comprises the anode. In this context, there is electrolytic continuity when ions of substances dissolved in the water can physically travel between the anode and the cathode.

It is recognised in the invention that the scrap iron or other material which is to comprise the anode need not necessarily be inserted directly into the aquifer material. The requirement is for the iron to be in effective operational electrical contact with the water in the aquifer, and this requirement can be obtained by placing the iron in a pond of water, provided the water in the pond is in electrolytic continuity with the water in the aquifer.

On the other hand, if desired, the scrap iron may be inserted into a hole drilled down from the surface into the material of the aquifer, provided the required contact with the water in the aquifer can thereby be established.

When the iron is placed in a pond of water, it will usually be the case that the water in the pond is water that has seeped down through the exposed portion of the seam of the mineral, with the result that the water in the pond is acidic. However, it is not essential that the water in the pond is water that has seeped from the seam. The requirement is that the water in which the anode is located be in electrolytic continuity with the water in which the seam is submerged, and this requirement may be met even though the direction in which the water in the aquifer is travelling is away from the pond and towards the (submerged portion of the) seam or mass. It may be noted that the water in which the anode is placed should be capable of conducting electricity, in the sense of allowing current to be maintained in the electrolyte.

The reactions which inhibit the formation of acidity have biochemical components, and whether the reactions are fully completed or not is quite dependent upon the time the water spends under the influence of the treatment system. If the nature of any of the parameters were such that the water passed through the system in only a few hours, say, then the diluting effect of the rapid flow might make the treatment process unnecessary. In most cases, however, water passes through the ground, and through ponds, only very slowly; the treatment system of the invention takes advantage of the fact that residence times of the water within the treatment system often will be measured in months.

If the flow of water through the seam or mass were rapid, as mentioned the treatment process as described might well be ineffective to treat acidity: the process relies on the long residence times. By the same token, however, if the flow of water through the seam were rapid, the treatment process might well be unnecessary, because if the flow of water were rapid, little acidity would have been picked up by the water. It is recognised that if the water has sufficient residence time to pick up hazardous concentrations of acidity, the water then has sufficient residence time for the treatment process to be effective.

Although the acidity is described as the result of a chemical reaction, bacteriological action, as mentioned, is instrumental in producing the acidity. The relevant bacteria lose viability as the water loses acidity. In the treatment process of the invention, an aimed-for effect is that the water does not gain acidity by passing through the pyrite, as a result mainly of the gaseous hydrogen produced at the cathode of the galvanic cell; that is to say, produced in the pyrite. It is recognised that the condition is self-sustaining: because the acid conditions in which the bacteria thrive, and produce more acidity, can hardly become established, the bacteria in turn tend not to thrive.

As mentioned, when iron is electro-chemically more active than the mineral, preferably the material of the electrode in the pond is iron, because iron is cheap and readily available. Other minerals or metals may be used, such as magnesium, provided the condition of electro-chemical activity is met. Preferably, the iron is in the form of pieces of scrap iron, which are connected together in electrical continuity, and which are placed in the pond, below the surface of the water.

In an optional alternative procedure, the invention may be applied to the treatment of acidity emanating from exposed beaches of mine tailings in a tailings pond. Here, the procedure typically includes the step of inserting a grid or grids of metal mesh or graphite into the body of tailings. Preferably, this insertion is done during the time the body of tailings is being built up by deposition, i.e. during operation of the mine. The grid or grids comprise the said electrical contact means, by means of which the tailings are caused to comprise the cathode of the electro-chemical cell, as described. The procedure includes the step of connecting the grid or grids to the electrical connection means.

In the tailings case, the tailings in the exposed beaches must be in electrically-conducting relationship with other portions of the tailings which are submerged below the water table; the anode may be immersed in the tailings pond, if such is present, provided the tailings pond is in electrolytic continuity with the water in which the said other portions are submerged.

If the whole body of tailings should dry out, the invention cannot be applied.

(A dried-out body of sulphide-containing tailings is of course very dangerous from an acidity-generation standpoint.)

It may be noted that the aquifer in which the treatment system of the invention takes place need not be connected with a surrounding aquifer. Thus, the invention may be applied to the situation where, for instance, a waterproof barrier has been installed around a site, to prevent leakage of contaminated water from the site. With the treatment system of the invention established, in fact it may be possible to remove the waterproof barrier, or at least to cease maintaining such barrier.

DESCRIPTION OF THE DRAWINGS AND DETAILED DESCRIPTION OF PREFERRED EMBODIMENTS

The invention will now be further described by referring to exemplary embodiments of the invention, as shown in the accompanying drawings. In the drawings.

The apparatus shown in the accompanying drawings and described below is an example which embodies the invention. It should be noted that the scope of the invention is defined by the accompanying claims, and not necessarily by specific features of exemplary embodiments.

Figure 1:
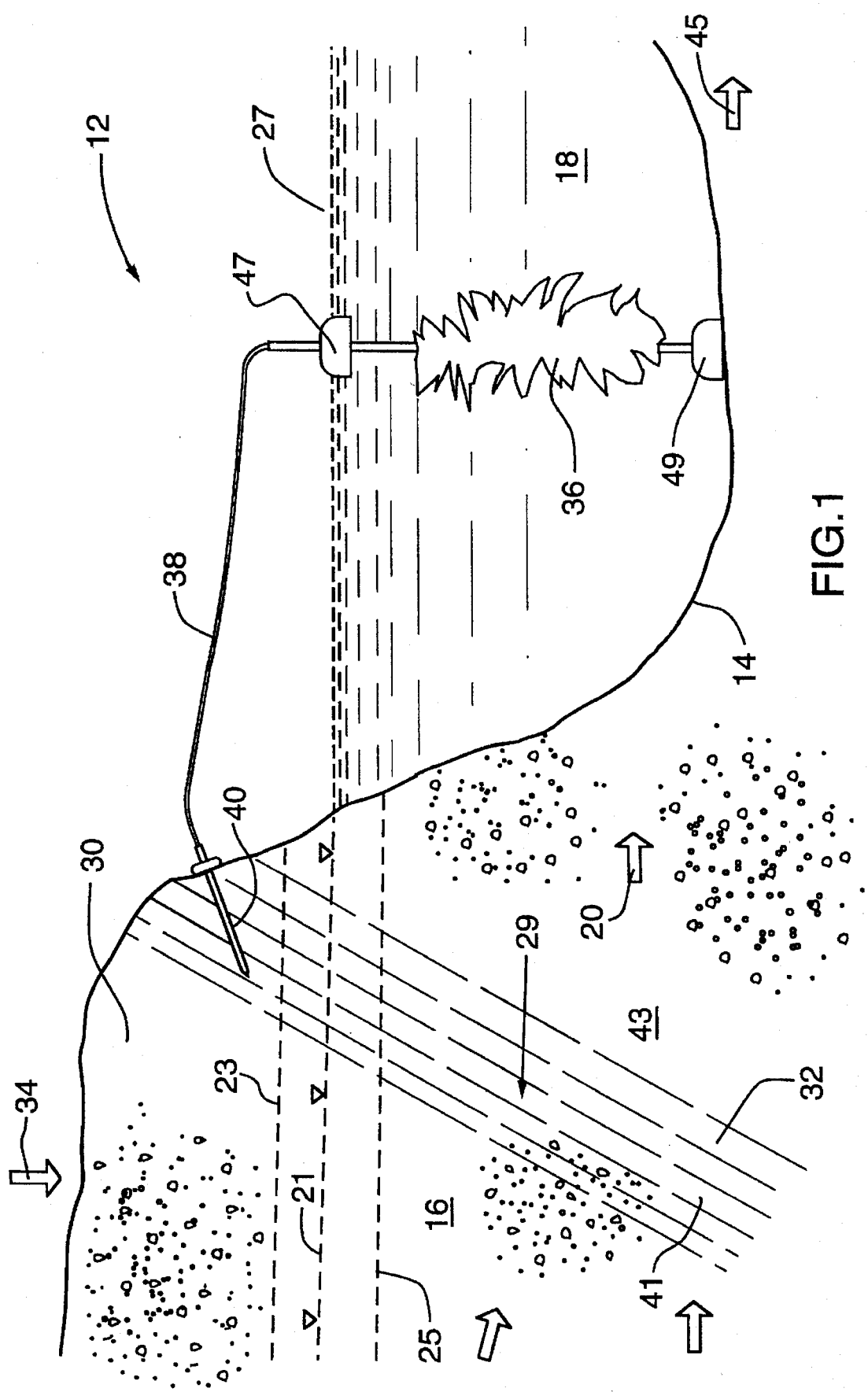
FIG. 1 is a (diagrammatic) cross-section of a pond of water that has collected in an abandoned strip mine, and is (potentially) acidic, in which treatment of the acidity by the system of the invention is being carried out.

In FIG. 1, a pond 12 has arisen following the abandonment of a strip mine, the excavations of which left a hollow 14 in the ground 16. The body 18 of water which comprises the pond 12 has come from direct precipitation and from seepage of groundwater 20 from the surrounding ground 16. The pond 12 may occupy an area of several square kilometers.

The water table 21 in the surrounding ground 16 varies with the seasons, and for other reasons, having a highest level 23 and a lowest level 25.

A seam 29 of pyrite is present in the surrounding ground. An exposed portion 30 of the seam 29 lies above the water table, and an underwater or submerged portion 32 of the seam 29 lies below the water table. (The exposed portion 30 lies exposed because of the excavations of the mine.) Precipitation water 34 seeps through the exposed portion 30 of the pyrite seam 29, and then enters the water 18 of the pond 12.

Located in the body of water 18 is a mass 36 of scrap iron. Each item in the mass 36 is in electrical contact with the other items in the heap, whereby all the items are at substantially the same electrical potential. The items are welded together, or wired together, in such a manner as will ensure their permanent electrical continuity.

An electrical conducting cable 38 is connected to the mass 36 of scrap iron. The cable 38 may be made of steel, on cost grounds, although steel is rather unsatisfactory as an electrical conductor, aluminum or copper being preferred.

Located in the seam 29 of pyrite is a steel rod 40. The rod 40 is of such a form as will ensure a good electrical contact with the pyrite. The rod 40 is a bar of steel, 3 or 5 meters long, of plain shape, which is firmly inserted so as to make a good contact. Alternatively, the rod may be provided with a screw-thread form, and may be screwed into the pyrite seam. The rod 40 connects to that portion of the pyrite seam which lies above the groundwater table.

The nature and state of the pyrite material affects how the rod 40 is to be inserted and attached: the pyrite in the seam may be naturally solid, in which case it is rock-like and brittle; or the pyrite in the seam may be mixed with other substances, such as graphite and other carbonaceous materials which are in themselves conductive.

The cable 38 is secured, in electrical conducting fashion, to the rod 40.

As mentioned, a portion 32 of the pyrite seam 29 is submerged below the water table. It may be noted that the groundwater 41 in which the portion 32 is submerged is water that is integral with the groundwater 20 approaching the pond 12, and with the body 18 of water actually in the pond. That is to say: (a) that the water 18 in the pond is able to physically transfer ions freely with the pyrite groundwater 41; and (b) that electrical conductivity is maintained between the water 18 in the pond and the groundwater 41 in which the pyrite seam is submerged. This means ions are transferred between the two bodies of water 18,41.

The pond water 18 is thus in electrolytic continuity with the pyrite water 41, and the pond water 18 and the pyrite water 41 together may be understood to constitute a combined unitary electrolyte 43.

An electrical cell is therefore established between the electrodes 29,36, current flowing one way through the cable 38, and returning through the electrolyte 43. The iron in the mass 36 is electro-chemically more active than the pyrite in the seam 29, whereby the mass 36 becomes established as an anode and the seam 29 becomes established as a cathode.

It may be noted that it is the seam 29 that comprises the cathode, not the rod 40. If the rod 40 were to extend below the level of the water table, whereby the rod became immersed in the electrolyte, the rod might well then take over from the pyrite seam as the electrode of the cell. The rod 40 should be regarded not as the cathode, but rather as a connector, whereby the cable 38 can be connected to the pyrite seam, thereby making the pyrite seam the cathode.

A configuration of the kind just described has been tested at the Sherman Mine in northern Ontario, Canada and generated a potential difference of 0.6 volts between a sulphide seam and an iron anode.

The electrolyte 43 contains an unacceptable concentration of what can be considered to be sulphuric acid, which actually is a solution containing hydrogen ions H+, sulphate ions SO4—, and bisulphate ions HSO4—. Because of the electrical circuit, acid generating reactions are inhibited and existing hydrogen ions in the vicinity of the cathode are able to acquire the electrons which have passed along the cable 38. The dissolved hydrogen ions therefore become gaseous hydrogen, which bubbles off from the cathode, i.e. from the pyrite seam 29. As the current continues to flow along the cable 38, hydrogen ions and other cations migrate towards the cathode, and are turned into gaseous hydrogen. This reduction of the hydrogen ions at the cathode gradually results in a substantial raising of the pH of the electrolyte.

At the anode, the iron of the anode, being the source of the electrons flowing along the cable 38, oxidizes and dissolves into the electrolyte, forming ferrous ions, Fe++. Dissolved sulphate ions in the electrolyte in the vicinity of the anode combine with these ferrous ions to produce ferrous sulphate. In the pond, ferrous sulphate is a harmless precipitate. Some of the ferrous iron produced by the oxidation of the anodic material oxidizes further to produce ferric iron, which precipitates as a gelatinous hydroxy compound. The settling of these precipitates to the bottom of the pond renders them harmless to the external environment. (In large quantities, ferrous sulphate can be a contaminant—water emerging from mine tailings, for instance, can be contaminated with ferrous sulphate—but in a strip mine pond, generally not enough ferrous sulphate is produced to constitute a hazard in itself.)

The iron in the mass 36 is sacrificial. The iron constituting the anode becomes depleted, in that the iron thereof provides the ferrous ions that go into solution.

It will be understood of course that this circuit and the reactions taking place therein are typical of the electro-chemical cell type of reaction. Included in the common uses of the electro-chemical cell type of reaction is the provision of sacrificial anodes, which are used to prevent acid-induced corrosion damage in many non-natural situations (e.g. pipelines, ship hulls, etc).

It may be noted that while the electrolyte 43 has a high acidity, an optimal voltage is maintained in the cell. This results in a rapid production of hydrogen gas at the cathode, and a rapid rate of reduction of the acidity. As the acidity becomes diluted, the voltage decreases, and approaches the point of electrical neutrality. In other words, the battery runs down. A new influx of acid water, if it occurred, would reactivate the cell. It should be noted that in the treatment system as described, even though slowed down, the reactions do still proceed.

One of the difficulties associated with previously proposed systems for treating acidic water, being systems in which the water was pumped into containers and through canisters containing various chemicals, was the very great residence time that would have been needed, once the acidity had become somewhat diluted, for the acidity to become so diluted that the water could be declared safe. Thus, it was reasonably economical, in the previous systems, to raise the pH of the water to, say, 4; but it became very expensive to continue to raise the pH to the 5.5 area, at which the water can be declared fit to re-enter natural groundwater systems.

By contrast, in the system as described, the water remains in the pond during treatment, and therefore the residence time is automatically very great. Water may be expected to remain in the pond for months, or years. Therefore, even though the electro-chemical reactions may slow down as dilution progresses, in the pond the reactions still do proceed, and produce a useful effect. The water 45 that seeps out of the pond 12, and enters the surrounding groundwater, may be expected in most cases to have environmentally safe pH levels (i.e., around 5.5 or higher), which pose no threat to water supplies, and to which organisms and fish are perfectly well adapted. Laboratory tests of the invention have produced and maintained pH levels near 5.5 using iron as the anode, and 6.5 using zinc.

This level of dilution can be expected even though the initial pH of the water in the pond might be in the 2.5 area, or even lower. In the system as described, the dilution is achieved without the input of energy, and largely without the need for maintenance (apart from monitoring). The treatment system can be put in place using only very low-cost materials, so that it is not uneconomical to over-engineer the system and to build-in large safety margins. It is not difficult or over-expensive, in fact, to over-engineer the system to the extent that if the pond is actually abandoned completely, the water 45 leaving the pond and entering the groundwater can be expected to remain acid-free, for generations.

It may be noted that the system of acid alleviation as described, which may be termed the electro-chemical-cell system of treatment for acidity, would not be so efficacious if the water were in fact flowing with a substantial flow rate through the "cell". It is mainly because water naturally remains in the cell for such long periods that the system can be so effective.

It has been described that the electro-chemical cell treatment system acts to prevent the breakdown of acid-generating minerals, (e.g. pyrite) and leads to the formation of secondary products such as iron hydroxide minerals. These substances in many cases will precipitate on the surface of the acid-generating minerals, and in cracks and voids. When this happens, the precipitates act as a filler or sealer material; this results in the material of the seam having a diminished permeability to oxygenated waters, which in turn inhibits the acid-generating characteristics of the system. In effect, the pyrite seam or mass gradually seals itself.

When this happens, the pyrite becomes much less of a threat, because new precipitation water then tends to by-pass the seam or mass of pyrite, and to enter the groundwater (and the pond) by more circuitous routes. Also, because the oxygen supply in the "sealed" pyrite is inhibited, such water as does pass through the pyrite can be expected to pick up correspondingly little acidity. (This may be compared with the fact that water passing though submerged, anaerobic, pyrite picks up virtually no acidity.)

The various effects that take place when the electro-chemical cell system is used, as described, may be summarised as:

(1) the acid generating reactions will be prevented from occurring;
(2) in the system, sulphate ions in the pond water combine with ferrous ions sacrificed by the scrap iron anode, and precipitate harmlessly;
(3) in the system, ferrous ions sacrificed by the scrap iron anode lead to the formation of gelatinous hydroxy precipitates; these substances also efficiently scavenge the solution of other potentially harmful metals;
(4) the precipitates serve to physically seal the seam or mass of pyrite against further oxidation, or rather against the harmful effects of further oxidation;
(5) any remaining sulphate ions form precipitates that offer little hazard to the environment.

It will be understood, therefore, that the electro-chemical cell system of treatment serves not only to inhibit or prevent the formation of acidity in the water that is entering the pond from the seam or mass of exposed pyrite but also serves to maintain the acidity of the pond water at an acceptable environmental level. This aspect of the electro-chemical cell system may be contrasted with previous chemical treatment systems: these may have served to dilute the acidity of the pond water (to some extent) but they did not serve to prevent the production of acidity at source.

The electro-chemical cell treatment system as described is an in-situ treatment system, which is maintainable over the long term with minimal maintenance costs. The system may be as close to a walk-away solution as is practically achievable. The system is in-situ in the sense that the acid-producing material is used directly in its place of repose; the material, in its place of repose, comprises the cathode of an electro-chemical cell.

It sometimes happens that the pH of the water in the pond can vary with the depth of the water, often in that the surface water is more acidic than the deep water. A float 47 is provided to ensure that the anode remains upright, and accessible to all depths. An anchor 49 holds the anode in position relative to the floor of the pond.

It can happen that water also enters the pond 12 from other zones, being water which enters the groundwater before passing through the seam of pyrite. Such water therefore never passes through the exposed pyrite, and therefore does not contribute to the acidity.

There may be other seams or masses of pyrite in the vicinity of the pond, and it is important that all the seams be in electrical continuity with the pond, if all are to be subject to the treatment reactions as described. This may require multiple electrodes.

Equally, it is important that electrolytic continuity be maintained between the water in the pond and the water in the seams or masses. If the water in any seam or mass is isolated from the water in the pond, water passing through that seam or mass would not be treated. In this connection the water in the seam or mass is isolated when physical transfer of ions from water in the pond cannot take place.

It may be noted that as the height of the water table falls, a short-term isolation of the water in the seam or mass can occur. The seam or mass itself might in fact dry out in drought conditions. This is not important; when continuity is re-established, the treatment reactions will resume.

The levels 23,25 of the water table are determined not so much as practical measurements, but as theoretically determined extremes, computed from knowing the rainfall, the lie of the land, etc, and bearing in mind the likely changes that might occur in future decades and centuries. The prudent engineer in charge of treatment of the pond of course assumes a margin of error in his estimates of the possible extremes of the water table, and of the consequent variations in the level 27 of the water in the pond.

It may be noted, as regards the stipulation of the water table level, that in most soils there is not a clear demarcation between saturated soil below the water table and dry soil above, but rather there is a gradual change from wet to dry. Of course, there is an amount of water or moisture even in the dry soil above the water table, and this moisture content will increase following precipitation.

The rod 40 should extend only so far down into the pyrite seam as to remain always above the water table. It is the pyrite itself that constitutes the cathode, not the rod. For the treatment to be properly operational, the pyrite material must be of such consistency as will ensure good electrical continuity within the seam. (A short-lived immersion of the rod 40 below the water table, for example after a heavy storm, would not matter.)

The electro-chemical-cell treatment system has been described as it relates to an abandoned (or operational) strip mine. But it is known that other kinds of activity can give rise to acidity in groundwater. For example, it is known that the mere movement of heavy machinery over shale can cause the shale to crack, allowing acid-causing minerals to leach out or to become exposed; thereafter, precipitation passing through the exposed minerals picks up acidity.

The pieces of scrap iron need to be in electrical continuity with each other, and the pieces may be wired or welded together.

Since the anode is sacrificial, and gradually used up, the quantity or amount of scrap iron 36 should be large enough to maintain the operation of the cell over a long period. A minimum or threshold voltage is necessary for hydrogen ions to be electrically reduced to hydrogen gas. Equally, the cable 38 should be of such dimensions and materials as not to cause any significant voltage losses, and the material should not be corrosive.

Figure 2:
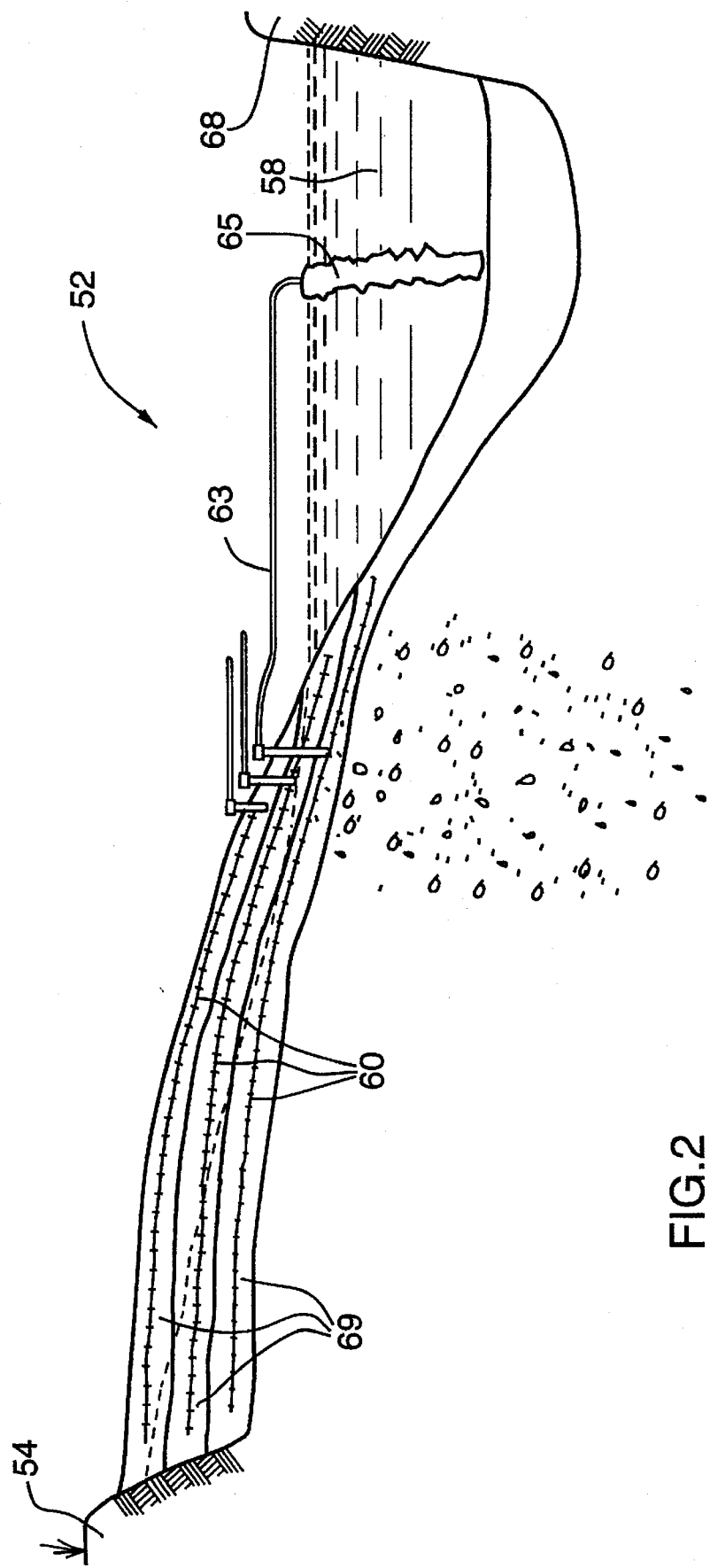
FIG. 2 is a (diagrammatic) cross-section of a mine tailings impoundment, which is (potentially) acidic, and in which treatment of the acidity by the system of the invention is being carried out.

FIG. 2 shows another situation in which the treatment system of the invention may be applied to alleviate acidity.

In FIG. 2, a mine tailings impoundment 52 is created by dams 54,68. Where the tailings contain an acid generating mineral such as pyrite, and where the tailings become exposed, water seeping down through the tailings can pick up unacceptable acidity, as described in the example of FIG. 1. Depending on the lie of the land, it is possible for some beaches 56 of tailings to become accidentally exposed, even though quite a considerable expanse and depth of water 58 remains over the rest of the tailings.

It can happen also that more material may be excavated from a mine than was originally planned when the tailings impoundment was put in (e.g. due to an increase in ore prices). In this case, the engineer wishes to have a system available to him whereby he can deliberately leave the excess tailings in an extended area where the tailings might be, or will be, or might later become, exposed.

The electro-chemical cell treatment system can be applied in such situations, provided electrical and electrolytic continuity can be maintained between the exposed tailings and the water in the ground, as previously described.

It may be determined from measurements and predictions that the exposed beaches of tailings will contain pyrite in such a mixture with other substances that the pyrite will have little electrical continuity; but yet that the other parameters which permit the electro-chemical cell treatment system are in place. In that case, to use rods such as the rods 40, to establish the connection to the pyrite, might be unsatisfactory. As shown in FIG. 2, a grid or grids 60 of metal mesh may be established in the exposed tailings beaches.

Individual meshes are constructed at chosen levels throughout the tailings as shown in FIG. 2. Each individual mesh is connected to its corresponding anode in the tailings pond (each mesh has a separate anode). While the tailings are saturated with water they do not represent a hazard since no acid is generated. However, in the typical case of an abandonment, the tailings dry out as the water table falls. As each level of tailings is exposed to the oxidizing conditions, independent electrochemical cells are established between the newly exposed tailings mass and the respective anode (69).

If electrical conductivity in the tailings themselves is high, only the upper mesh is theoretically needed. However, the lower meshes with their independent anodes constitute an assurance for those cases where vertical electrical conductivity within the tailings body is poor.

Of course, for currently-operating mines, the grids 60 would be put in place as the tailings are being built up. For abandoned tailings masses, a grid would be inserted into the exposed portion of the tailings. If the beaches of tailings already exist, and if a satisfactory connection cannot be made with rods inserted into the beaches, the treatment system as described would be unsuitable.

The grids 60 are connected by means of cables 63 to a heap 65 of scrap iron placed in the water 58.

Grids 60 may be placed at different levels, as shown, as the tailings are being built up. Different areas of the beaches 56 will become exposed at different water table levels, and this can be reflected in the extent of the grids at the various levels.

As mentioned, water seeping down through submerged pyrite (as distinct from exposed pyrite) will not, as a rule, pick up acidity. However, when the water seeping down through the submerged pyrite is already somewhat acidic, that water can pick up extra acidity from the submerged pyrite. This can happen when the lightly-acidic water seeping down contains a substantial content of ferric ions, for example, which can act to cause oxidation even of the submerged pyrite. Therefore, the prudent designer of the impoundment will extend the grid even into those zones of the tailings which he knows will always remain submerged.

Again, as mentioned, if the nature of the pyrite and of the body of tailings is such that electrical continuity exists naturally throughout the pyrite, and is of such a nature that an electrical connection to a driven-in rod can be readily established, the grid is not in any event required.

The procedure as described is aimed at preventing acid formation at the source (i.e. in water seeping through the exposed minerals) as well as alleviating the acidity in an already-existing pond of water. By comparison with other means for achieving either one of those functions, the procedure as described is very inexpensive. The procedure also is satisfactory from the standpoint of maintenance, in that the procedure can be made to function, if desired, substantially without any maintenance at all.

In some cases, the treatment processes may be too slow, in that it may be desirable to obtain a more rapid reduction in acidity, or it may be desirable to ensure that acidity reduction gets under way as rapidly as possible. If so, an externally-derived EMF may be applied to the electro-chemical cell. In that case, of course the zero or minimum maintenance status cannot be attributed, but even so the maintenance required would be relatively inexpensive.

An electro-chemical cell based on the use of a sacrificial anode is referred to, in the usual terminology, as a galvanic cell; an electro-chemical cell based on an inert anode and an external DC electrical source is referred to as an electrolytic cell. The present invention preferably utilizes a cell of the galvanic type, in this terminology, but contemplates and includes also a cell of the electrolytic type. One drawback that may be expected is that an electrolytic cell will not have such a significant effect on the pH of the water passing through, but that it will, however, be effective to inhibit the acid generating reactions that would otherwise occur. Where the inhibition of the acid-generating reactions is a primary goal, use of the electrolytic cell may be more appropriate.

We claim:

1. Procedure for inhibiting the formation of, and for alleviating, acidity in water, wherein:

the water upon which the procedure is carried out is a body of water residing in an aquifer below the water table in the ground, being ground in which there exists a seam or mass of a mineral;

in respect of the ground in which resides the body of water upon which the procedure is carried out, the disposition of the seam or mass in the ground is such that the seam or mass has an exposed portion, being an upper portion of the seam or mass which lies above the water table, and the seam or mass has a non-exposed portion, being a lower portion of the seam or mass which lies in the aquifer below the water table;

the mineral in the seam or mass is of the kind in which, when water passes through the said exposed portion, the water picks up acidity;

the disposition of the seam or mass and the aquifer is such that water passing down through the said exposed portion enters the aquifer;

the mineral in the seam or mass is of the kind that is electrically conductive;

the disposition of the seam or mass and the aquifer is such that the non-exposed portion of the seam or mass is in effective electrical contact with the body of water in the aquifer;

the procedure includes the step of providing a contact means, and of connecting the contact means to the mineral in the seam or mass, whereby the contact means makes effective electrical contact with the mineral;

the procedure includes the step of providing an electrode comprising a body of an electrically-conductive substance;

the procedure includes the step of so placing the electrode in relation to the body of water in the aquifer that the electrode is in operative effective electrical contact with the body of water in the aquifer;

in respect of the ground in which resides the body of water upon which the procedure is carried out, the extent and continuity of the body of water in the aquifer are such that ions of substances dissolved in the water can physically travel between the mineral and the electrode;

the procedure includes the step of providing an electrical connection means, and of connecting the same between the electrode in the water and the contact means in the mineral;

the substance comprising the electrode is higher in the electro-chemical series than the mineral comprising the seam or mass;

whereby the mineral in the seam or mass comprises the cathode, and the electrode in the water in the aquifer comprises the anode, of an electro-chemical cell, and whereby the body of water in the aquifer, being in effective electrical contact with both the mineral and the electrode, comprises the electrolyte of that cell.

2. Procedure of claim 1, wherein, in respect of the ground in which resides the body of water upon which the procedure is carried out, the mineral is of the kind in which acidity is caused by oxidation of the mineral, and wherein a portion of the body of the mineral is exposed to the atmosphere.

3. Procedure of claim 2, wherein the mineral contained in the body of mineral is mainly pyrite.

4. Procedure of claim 1, wherein, in respect of the ground in which resides the body of water upon which the procedure is carried out, the material of the electrode is iron.

5. Procedure of claim 1, wherein the procedure includes the step of providing the contact means in the form of a rod or rods of metal inserted into the body of the mineral.

6. Procedure of claim 5, wherein:

the procedure includes the step of placing the rod or rods so as to be in electrical contact with, and in direct physical contact with, the exposed portion of the seam or mass;

the procedure includes the step of so placing the rod that the rod is isolated from direct physical contact with the non-exposed portion of the seam or mass;

the procedure includes the step of so placing the rod that the rod lies wholly above the water table.

7. Procedure of claim 1, wherein:

the ground in which resides the body of water upon which the procedure is carried out, includes a hollow, and a pond of water resides in the hollow;

the location and nature of the pond is such that the water in the pond is in electrolytic continuity with the water in the aquifer;

and the procedure includes the step of placing the body of the substance comprising the electrode in the water of the pond.

8. Procedure of claim 7, wherein the procedure includes the steps of providing the electrode in the form of pieces of scrap iron, of connecting the pieces together in electrical continuity, and of placing the said pieces in the pond, below the surface of the water therein.

9. Procedure of claim 7, wherein the procedure includes the step of providing the electrical connecting means in the form of an electrical cable connected between the electrode in the pond and the contact means in the body of the mineral.

10. Procedure of claim 7, wherein:

the procedure includes the steps of providing the electrode in the form of pieces of scrap iron, of connecting the pieces together in electrical continuity, and of placing the said pieces in the pond, below the surface of the water therein;

the procedure includes the step of providing the contact means in the form of a rod or rods of metal inserted into the body of the mineral;

and the procedure includes the step of providing the electrical connecting means in the form of an electrical cable connected between the iron in the pond and the rod or rods in the body of the mineral.

11. Procedure of claim 1, wherein the procedure includes the step of so placing the electrode, in relation to the disposition of the aquifer, and the seam or mass, that water naturally flows, under the action of gravity, in the direction from the exposed portion of the seam or mass, through the aquifer, and towards the electrode.

12. Procedure of claim 7, wherein the disposition of the seam or mass, the aquifer, and the pond, is such that water naturally flows, under the action of gravity, in the direction from the exposed portion of the seam or mass, through the aquifer, and into the pond.

13. Procedure of claim 1, wherein:

in respect of the seam or mass of the mineral existing in the ground in which resides the water upon which the procedure is carried out, the seam or mass comprises a body of mine tailings, and the exposed portion of the seam or mass comprises a beach of the tailings that is exposed to the atmosphere;

the procedure includes the step of inserting a grid or grids of metal mesh into the tailings, during the time the body of tailings is being built up by deposition, whereby the grid or grids comprise the said electrical contact means when the tailings become exposed;

and the procedure includes the step of connecting the grid or grids to the electrical connecting means.

14. Procedure of claim 1, wherein:

in respect of the seam or mass of the mineral existing in the ground in which resides the water upon which the procedure is carried out, the seam or mass comprises a body of mine tailings, and the exposed portion of the seam or mass comprises a beach of the tailings that is exposed to the atmosphere;

the procedure includes the step of inserting a grid or grids of metal mesh into the exposed beach of tailings, whereby the grid or grids comprise the said electrical contact means;

and the procedure includes the step of connecting the grid or grids to the electrical connecting means.

15. Procedure of claim 1, wherein the procedure includes the step of applying an externally-energised EMF to the circuit that includes the said anode, cathode, and electrolyte.

* * * * *